United States Patent
Wirthwein et al.

(10) Patent No.: US 6,288,331 B1
(45) Date of Patent: Sep. 11, 2001

(54) CABLE DUCT AND COVER

(75) Inventors: Udo Wirthwein; Otto Kaulbersch, both of Creglingen; Jürgen Michel, Riedenheim, all of (DE)

(73) Assignee: Udo Wirthwein, Creglingen (DE)

( * ) Notice: Subject to any disclaimer, the term of this patent is extended or adjusted under 35 U.S.C. 154(b) by 0 days.

(21) Appl. No.: 09/319,158

(22) PCT Filed: Nov. 28, 1997

(86) PCT No.: PCT/EP97/06634

§ 371 Date: Jul. 14, 1999

§ 102(e) Date: Jul. 14, 1999

(87) PCT Pub. No.: WO98/32205

PCT Pub. Date: Jul. 23, 1998

(30) Foreign Application Priority Data

Nov. 28, 1996 (DE) .............................. 196 51 017

(51) Int. Cl.[7] .................................................. H02G 3/04
(52) U.S. Cl. .................. 174/48; 174/66; 220/241
(58) Field of Search .................. 174/48, 66; 220/241, 220/3.8; 52/220.3, 220.5

(56) References Cited

U.S. PATENT DOCUMENTS

| | | | |
|---|---|---|---|
| Re. 28,756 | * | 4/1976 | Fork ................................. 52/221 X |
| 2,912,197 | * | 11/1959 | Hudson .......................... 52/220.3 X |
| 3,435,568 | * | 4/1969 | Hoseason et al. ...................... 52/221 |
| 3,494,381 | * | 2/1970 | Fork ................................ 52/220.3 X |
| 3,724,148 | * | 4/1973 | Bregenzer ............................. 52/221 |
| 4,338,484 | * | 7/1982 | Littrell ................................... 174/48 |
| 4,873,600 | * | 10/1989 | Vogele .............................. 174/50 X |
| 5,591,938 | * | 1/1997 | Navazo ................................. 174/50 |
| 5,613,339 | * | 3/1997 | Pollock .......................... 52/220.5 X |

FOREIGN PATENT DOCUMENTS

| | | |
|---|---|---|
| 34 47 836 | 7/1986 | (DE) . |
| 39 36 003 | 5/1990 | (DE) . |
| 93 02 291 | 6/1993 | (DE) . |
| 295 01 017 | 5/1995 | (DE) . |
| 051 307 26 | 5/1993 | (JP) . |
| 6-7726 | 1/1994 | (JP) . |
| 062 845 43 | 10/1994 | (JP) . |
| WO 94/21018 | 9/1994 | (WO) . |

\* cited by examiner

*Primary Examiner*—Dean A. Reichard
*Assistant Examiner*—Angel R. Estrada
(74) *Attorney, Agent, or Firm*—Cohen, Pontani, Lieberman & Pavane

(57) ABSTRACT

A cable duct formed by cable troughs, an elevator cable duct and corresponding covers. The elevator cable duct has props and supports arranged thereon which extend in the longitudinal direction of the cable duct as well as plastic troughs which can be aligned next to each other, thereby forming a cable duct. The troughs have recesses on the outside which can be reversed-drawn above the support, where the troughs can be locked in positive fit or by frictional engagement. The recesses are deep enough to enable the support to lie inside the sleeve of the troughs when the troughs are mounted. The support is insulated from the outside by aprons. A longitudinally displaceable cover, which can be fixed to the trough, is located on top of the trough.

21 Claims, 9 Drawing Sheets

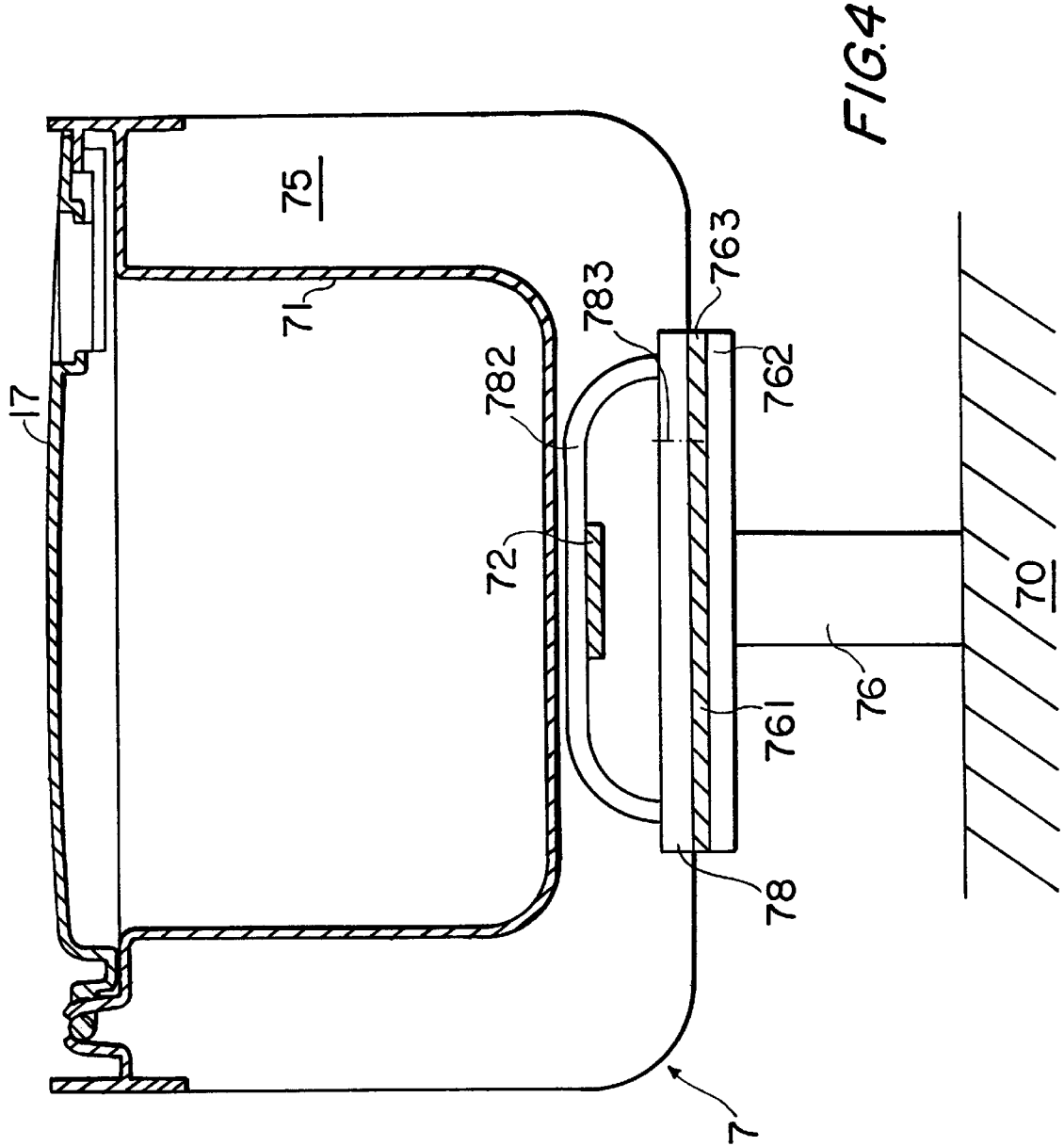

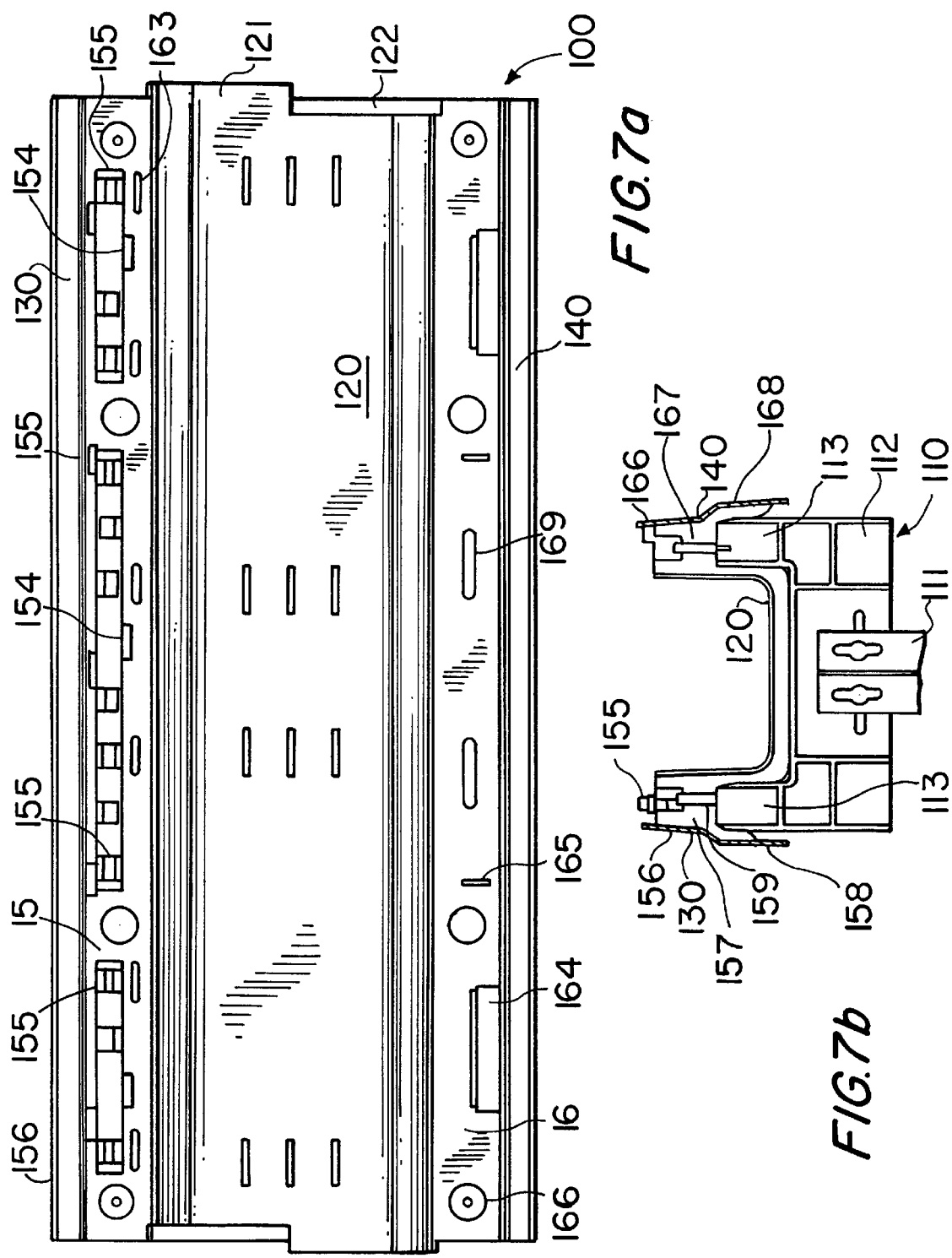

CABLE DUCT AND COVER

BACKGROUND OF THE INVENTION

1. Field of the Invention

The invention relates to a cable duct made up of plastic troughs, which can be lined up in a row next to one another, and to an elevated cable duct, and to covers therefor.

2. Discussion of the Prior Art

Plastic cable ducts with approximately U-shaped troughs which are provided with a cover are known from WO 94/21018. These troughs, which can be endlessly lined up in a row next to one another and are provided with connectors, are injection molded, predominantly from recycled plastic, such as polyester, polyurethane or polyethylene, in lengths measuring approximately 1 m. These troughs are equipped with special ribs and protrusions which allow such ducts to be buried in the ground, in particular along railroad routes. It is possible to walk on the cover.

A brochure published by Krupp, DE, and entitled "Der Kunststoffkabelkanal DRAE-KA" discloses the practice of elevating such cable ducts in marshland. The brochure sets forth a wood pile with boards which extend thereon from pile to pile and serve as a supporting structure for the cable duct. Of course, exposure to weathering means that such a supporting structure has only a very short service life.

German references DE 39 36 003 C2 and DE 34 47 836 A1 disclose elevated cable ducts in the case of which trough-like sheet-metal cable-duct elements are screwed to metal supports and transverse securing means provided thereon. Both the supports and the transverse load-bearing members as well as the troughs, which are all screwed to one another, are connected at short spacings to the parallel rail track by corresponding grounding cables. This measure is necessary both because it is possible for the cables in the trough to become defective, and thus for the entire cable duct to become conductive, and because, in the case of a contact wire of an electric railroad rupturing, the formation of parasitic voltages is possible, and this has to be prevented. Nevertheless, in the meantime, the railroad companies no longer allow such sheet-metal ducts on electrified stretches of track. Operators who happen to be present could be put in danger by current surges and corresponding conduction of the ducts; moreover, problems may arise as far as signalling is concerned, in particular for the presence-of-trains indicating system.

Although cable ducts which are known from WO 94/21018 have been used successfully when buried in the ground, their application area is limited, e.g. in tunnels or where water build-up is to be expected and in cases of flush out and stretches where embankment slippage is to be expected.

SUMMARY OF THE INVENTION

The problem on which the invention is based is thus to provide improved plastic troughs which can be elevated, and covers which are suitable therefor. It is a further object to provide, for corresponding cable ducts, a means of elevation which takes into consideration of the previously mentioned boundary conditions for such ducts and can be installed both on ground supports and on wall supports.

The invention takes as its departure point, in principle, the cable ducts set forth in WO 94/21018 and, for this purpose, uses, inter aila, the example of the elevated-pile trough according to DE 34 47 836 A1. However, the cable ducts can only be produced in short lengths on extremely large injection-molding machines, with the result that there is no question of straightforward transfer of the solution which is known per se, because such a small support spacing would not be cost-effective in most cases; in addition, the support spacing would always have to match up exactly with the parting joint of the ducts, in order for it to be possible to secure adjacent troughs of the cable ducts.

For this reason, in a variant according to the invention, first of all the support is provided with a load-bearing member, which extends in the longitudinal direction of the cable duct and on which the troughs are then fitted without also having to be fastened separately on the load-bearing members. For this purpose, the troughs are provided, according to the invention, with recesses which are configured precisely such that they can accommodate the load-bearing members as soon as the trough is fitted over the load-bearing members. Ideally, the recesses are configured such that, after having been fitted on, the troughs retain with a friction fit or grip round the load-bearing members, or parts of the load-bearing members, in the manner of a clamp-action or snap-action closure. A slight capacity for longitudinal displacement on the load-bearing members is quite desirable here in order for it to be possible to line up the troughs in a row next to one another without any sizeable joints. The trough connectors which can be used for this purpose are set forth in WO 94/21018, but may be dispensed with in the case of the invention. Instead of such clamp-action or snap-action closures directly on the recesses, it is also possible for parts of the trough to be configured, preferably on the sides or beneath the base thereof, such that they grasp with a friction fit, or grip round, the load-bearing member. For an effective transition from trough to trough, and in order also to limit even slight torsion of the troughs with respect to one another, the trough ends may be provided with tongues, which may in each case be part of the inner wall of the following trough. Alternatively, or in addition, the troughs are connected to the load-bearing members by screws, e.g. self-tapping metal screws. After the troughs have been fitted and positioned, such screws can be drilled into the load-bearing members from above by way of the trough borders, it being possible for corresponding guides to be injection molded into the trough borders as an aid.

In order to escape the risk of disruption to presence-of-trains indicating systems or else to avoid an undesired short circuit due to a contact wire falling down, the recesses are configured, according to the invention, such that the load-bearing member is essentially concealed within the shape of the trough. In other words, the recesses are shaped on the outside such that, when the trough is installed, the load-bearing members are located within the contours of the trough, said contours being defined by the outsides of the trough, i.e. the trough has, at the same time, an apron which is connected integrally to the trough.

This means that no current-carrying part can reach the load-bearing members. This applies equally for the damaged cables which may be located within the trough. In some cases, it may be expedient first of all to produce, and install, plastic troughs which are of relatively straightforward configuration, and can thus be injection molded relatively inexpensively, and only to provide means for covering the load-bearing members subsequently as required, if no other grounding arrangement is possible. These means are, for example, aprons which are made of insulating materials and can be provided on the trough, the load-bearing member or a support by, for example, adhesive bonding or screw-connection such that the load-bearing members are concealed. The load-bearing members are usually formed from metal profiles, preferably from steel profiles. In a preferred embodiment, these are rectangular tubes or round tubes which, for reasons of corrosion prevention or for a better friction fit with the trough, may additionally be coated with plastic. However, it is also possible for T-profiles or L-profiles or U-profiles of corresponding design and arrangement to be used, in principle, even if these may involve disadvantages—as a result of production—in terms of dimensional stability, torsion and/or surface protection.

Such metal profiles can easily absorb loads of 100 kg per meter or more, as is conventionally required of cable ducts on railroads.

Ideally, each trough rests on two parallel load-bearing members which are arranged at a horizontal spacing apart in the bottom part of the trough when the trough is in its use position.

However, it is also possible, for relatively narrow trough cross sections, for all loads to be absorbed by a single profile in a corresponding recess of the trough base or of the trough-stiffening rib system, e.g. the stiffening ribs extending transversely with respect to the trough. Such a system of load-bearing members is recommended, in particular for divided troughs.

Not absolutely necessary according to the invention but, in the preferred embodiment, the most straightforward method of connection consists in the supports being connected to such load-bearing members at a spacing of 6, 8 or 10 m, this resulting in a horizontal endless support. For reasons of electric insulation and corrosion, and also for easy installation with plastic moldings, these load-bearing members are screwed to the supports. Said moldings are to be designed, on the load-bearing-member side, such that they at least partially grip round the support. Screw-connection of the load-bearing members to the moldings can take place from the underside, but it is more straightforward, from the point of view of installation, for a rectangular tube, for example, to be connected by screws, in the use position, from the side to corresponding flanges of the moldings. The supports themselves comprise, for example, steel load-bearing members or similar profiles which project vertically into the ground or project, as supports, first of all vertically and/or horizontally into an adjacent masonry structure, for example into a tunnel wall, and are fastened there.

These cable ducts are usually provided, as is known per se, with covers on which, in part on account of their rigidity and resistance to footfall impact, it is also possible to walk. The covers should be capable of being locked to the troughs. For this purpose, in another embodiment of the invention, the trough border is provided, on one or both sides of the trough, with through-passages and/or protuberances, which permit a form fit, for example interlocking, in particular with covers which have complementary devices and ribs or stiff borders on the cover underside. In addition, locks may be provided for authorized opening of the covers. A problem arises, in particular, in the case of troughs which are fixed on the load-bearing members. As a result of heating up, e.g. insolation, it is possible for the cover to extend to a more pronounced extent than the troughs and for the latter to extend to a more pronounced extent than the load-bearing members. It is possible to compensate for the longitudinal expansion of the covers in that overlapping expansion is provided in design terms from the outset. In addition, the covers may be configured, at the start, to be longer than the troughs, with the result that it is possible to take account, synergistically, both of a gap produced at the cover ends, by production or installation tolerances, and the heat expansion.

On the other hand, the cover should retain its rigidity. For this reason, it is not just the case that a thin overlapping lip is selected; rather, the cover maintains its basic structure with the stiffening means on the underside, but it is more than halved in thickness and there is provided a stiffened border which grips over the neighboring cover. For this purpose, however, it is additionally necessary to have a capacity for longitudinal displacement on the form-fitting elements between cover and trough. In the case of hinge connections, this is achieved according to the invention in that the bolt/bolt-hole connection is configured in a longitudinally moveable manner, e.g. the bolt is configured to be longer than its securing means. Further hooks, for example for securing the cover against being lifted off, may engage in slots in the trough border. According to the invention, it is also possible to provide, on the trough borders, protuberances which are in operative connection with the ribs or borders of the cover, in that they are used at the same time as a fixed point for specific expansion of the cover or as a guide for satisfactory closure of the cover or lock.

BRIEF DESCRIPTION OF THE DRAWINGS

The invention is to be explained in more detail, with reference to exemplary embodiments, in a drawing, in which:

FIG. 1b shows a supporting arrangement for a cable duct according to FIG. 1a;

FIG. 4 shows an alternative embodiment of the invention, with a flat-steel load-bearing member with brackets welded on it;

FIGS. 7a, b show a further embodiment of the trough in a plan view and in section, in the installed, use position;

FIGS. 8a–d show a cover according to the invention in a plan view (a), a bottom view (b), in longitudinal section (c) and cross section (d) according to FIG. 8a.

DETAILED DESCRIPTION OF THE PREFERRED EMBODIMENTS

Figure 1A:
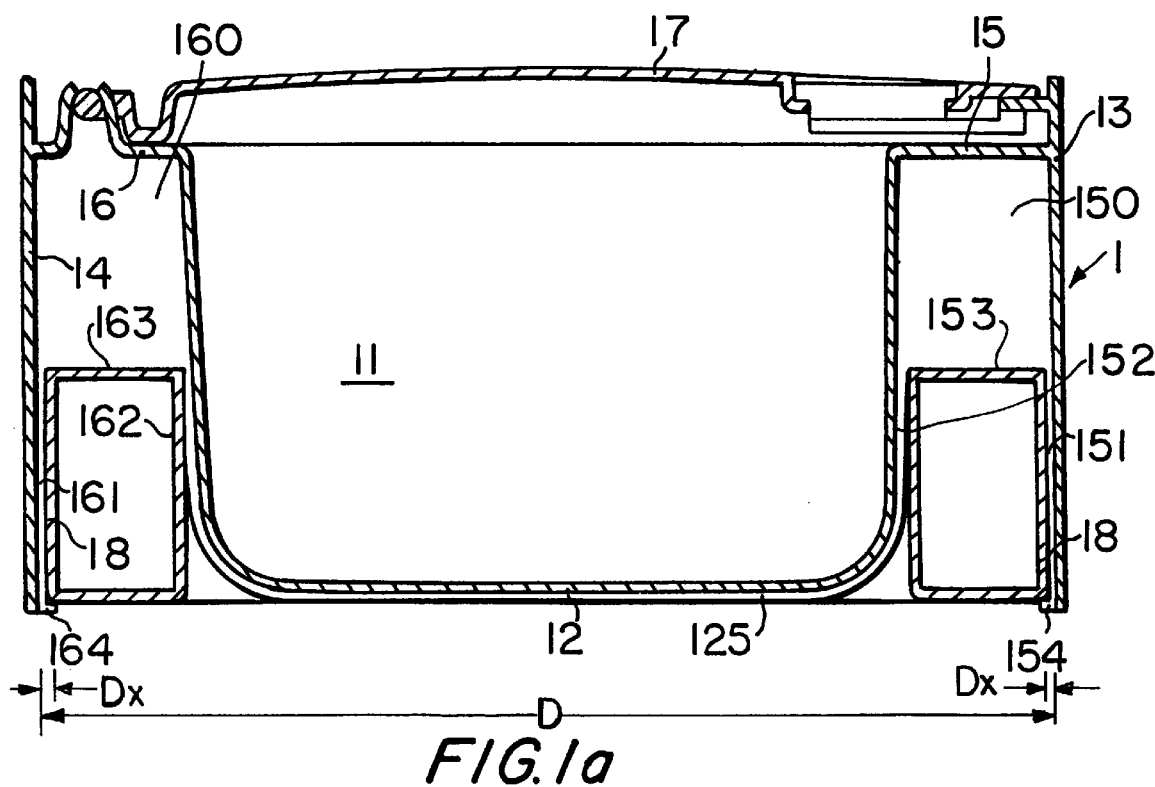
FIG. 1a shows a partial section through an approximately U-shaped plastic trough, in contact with the load-bearing members, and a load-bearing-member fastening.

Identical or similar parts are provided, in part, with the same designations hereinbelow. FIG. 1a shows a cross section through a cable duct 1 according to the invention. A duct element with a polyethylene trough 11 for receiving cables is stiffened by ribs 150 and 160 between the inner wall 12 in each case and the outer walls 13 and 14, and limited by the trough-border bearing means 15, 16 for the cover 17. Depending on the length of the trough 11, said transverse ribs may be arranged at regular spacings along the trough. The extremities 152, 162 of the ribs terminate in the base-stiffening means 125. Along the walls 13, 14, which terminate the trough 11 as a whole on the outside, the rib parts 151 and 161 respectively run in the vertical direction from the bottom edge 153, 163 of the ribs 150, 160 and terminate in protrusions 154 and 164. Two rectangular steel tubes 18 rest—in a manner which is not illustrated—on a vertical support above the base. The tubes 18 are positioned such that their outer walls are spaced apart by the distance D. After preliminary installation of the tubes 18 on the support, the entire trough 11 can be fitted over the tubes 18, with the result that the latter engage in the recesses respectively formed by edges 151, 152, 153 and 161, 162, 163 of the ribs 150 and 160. With the exertion of a small amount of pressure, the tubes 18 latch in the recesses, after the protrusions 154 and 164 have been bent back elastically by the prestressing dimension DX, and retain the trough 11 in the use position, as is illustrated in FIG. 1a. As is known per se from WO 94/21018, the cover 17 can be placed in position later, when the cables are located in the trough. The distance between the ribs 151–161 may be configured to be somewhat smaller than the dimension D, with the result that the trough 11 is retained on the tubes 18 in a clamping manner. In this case, it would be possible to dispense with the elastic protrusions 154, 164. In order to improve the friction fit in relation to the trough, the tubes may be coated with a thin plastic layer. This also prevents corrosion of the tubes during storage or installation.

The tubes 18 are mounted on supports at spacings of, for example, 6 m, this resulting in an endless load-bearing pair of tubes 18 on which short troughs of, for example, 1 m in length can be secured.

Figure 1B:
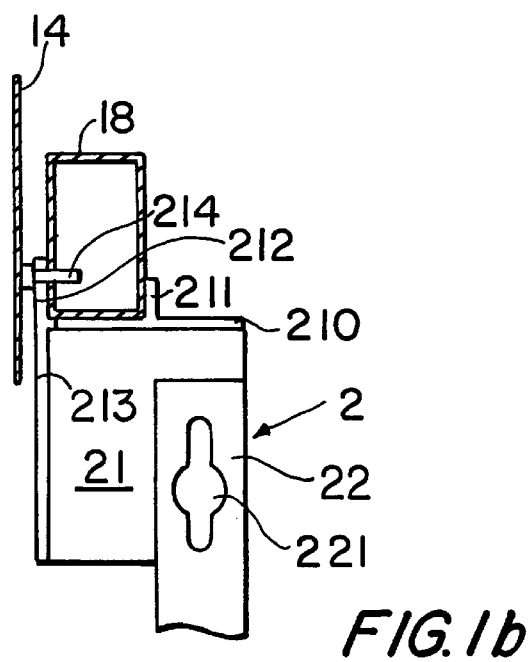

According to FIG. 1b, the load-bearing members are incorporated in the cross-sectional profile of the trough such that they do not protrude. This means that contact with overhead lines which fall down is not possible. FIG. 1b shows a possible fastening of the tubes 18 on a means of elevation 2 for a cable duct 1 according to FIG. 1a. Between the ribs 160 (not illustrated), the tube 18 rests on supports 22 comprising a T-profile. A plastic molding 21 with a base 210 and a head flange 213 is fastened on the T-profile by means of screws 221 and insulates the tube 18 from the T-profile. The tube 18 is introduced between the flanges 211, 212 of the molding 21 and fixed there by, for example, sheet-metal screws 214 which engage through the flange 212 and the wall of the tube. It is then possible for the trough 11, illustrated here as an outer wall 14, to be fitted over the tube. The operation of installing this cable duct 1 is very much simplified by the specified procedure.

Figure 2A:
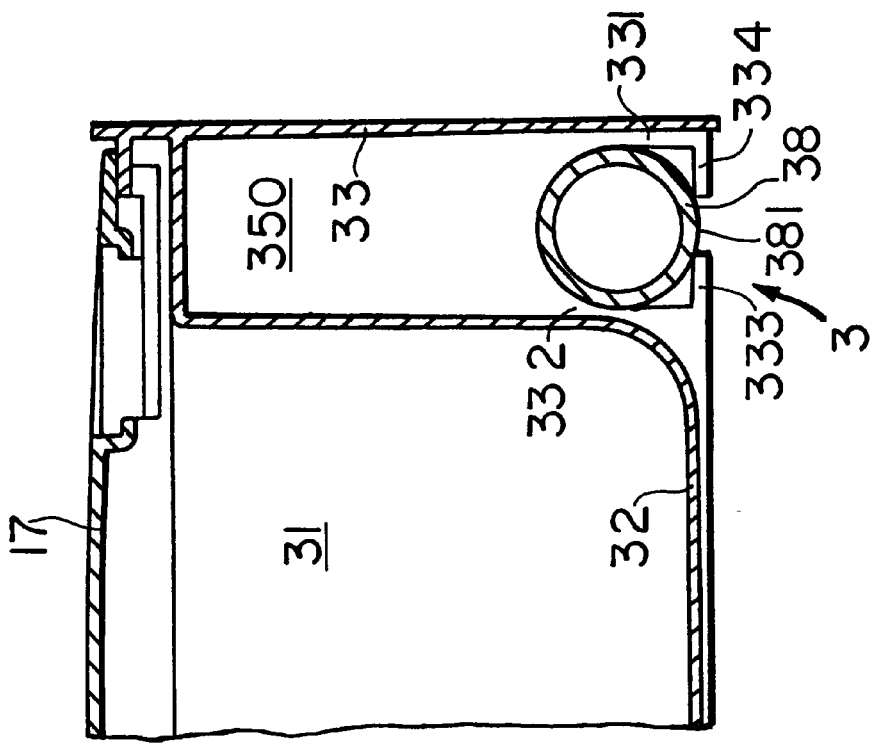
FIGS. 2a, b show two further embodiments of the invention, using load-bearing members respectively comprising a round tube and double-T profiles.

FIGS. 2a, b respectively show alternative cable ducts 3 and 4, with trough 31, 41, corresponding to FIG. 1a. In FIG. 2a, however, the rib 350, between the inner wall 32 and the outer wall 33, is configured in the bottom region, with the parts 331 and 332, such that it can accommodate a round tube 38 with a coating 381 as a load-bearing member. In the resulting recess, the load-bearing member is retained behind the elastic noses 333, 334 in the manner of a snap-action closure.

Figure 2B:
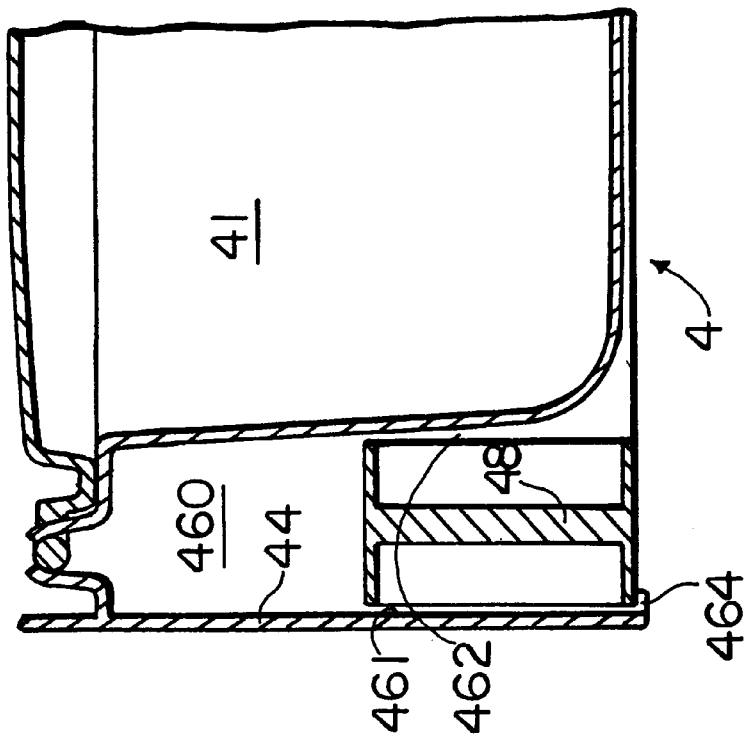

FIG. 2b shows the cable duct 4 with trough 41 and outer wall 44. The load-bearing member is designed as a double-T load-bearing member 48 and is retained by the vertical continuations 461, 462 of the rib 460. The catch 464 grips round the bottom flange of the load-bearing-member profile and thus retains the trough in the use position. The troughs 31, 41 may be fitted over the load-bearing member as is described according to FIG. 1a.

FIGS. 3 to 6 illustrate trough shapes which are slightly different, but are retained in accordance with the same principle of the invention.

Figure 3A:
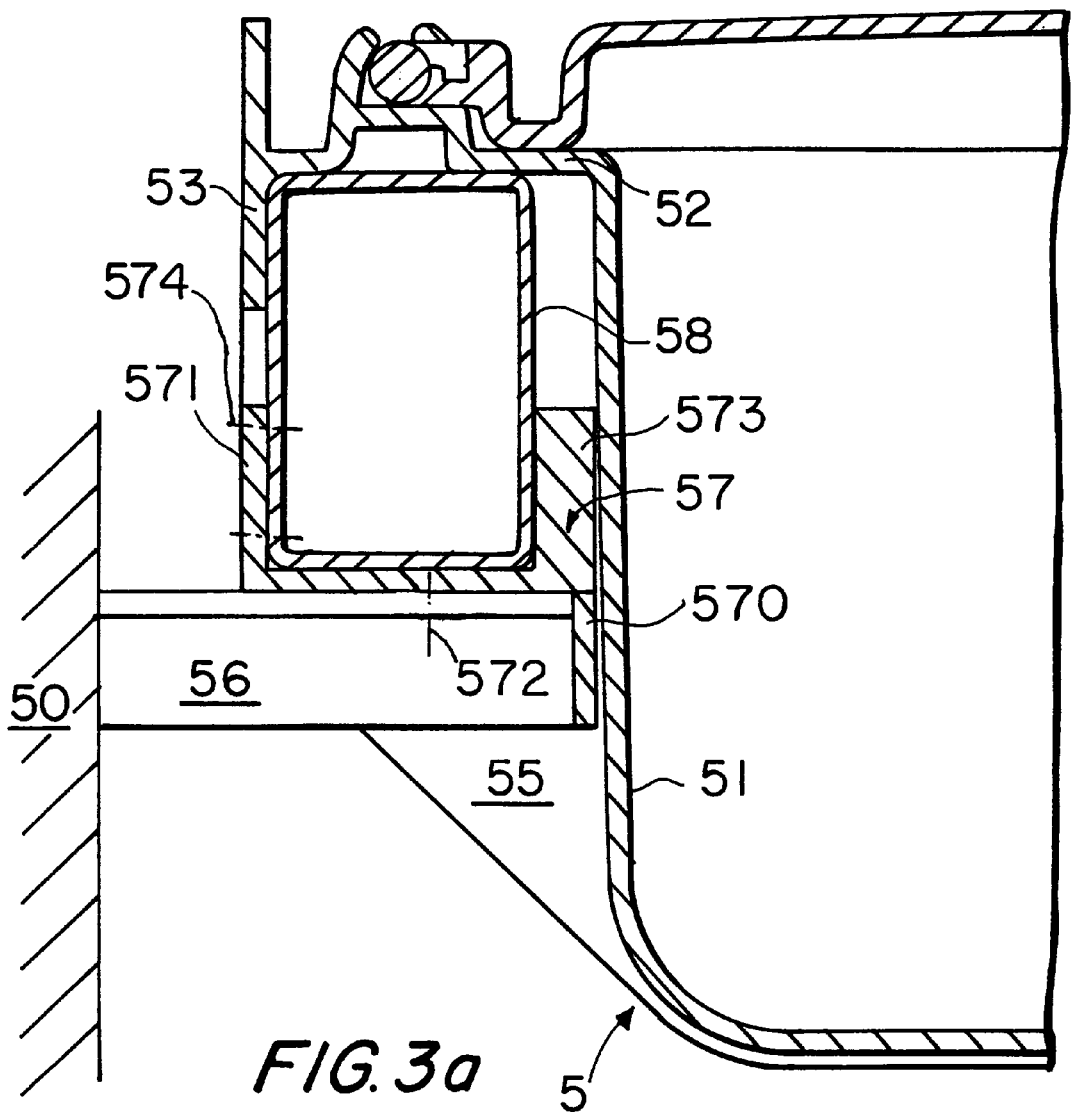
FIGS. 3a, b show other embodiments of the invention, respectively with L-shaped and H-shaped load-bearing members supporting the trough laterally.

FIG. 3a, with cable duct 5, shows an embodiment in the case of which a support 56 projects horizontally out of a tunnel wall 50. A plastic molding 57 is positioned on the support 56, which is designed as a T-profile with a horizontal top flange. The two parts are connected to one another by screws 572. The flanges 571, 573 enclose a rectangular tube, which is designed as a horizontal load-bearing member 58, and secure the same by means of screws 574. The trough is supported, by way of the outside of the inner wall 51, on the flange 570, 573 of the molding 57 and otherwise rests on the rectangular tube by way of the cover-bearing means 52 and the outer wall 53. In this case, the maximum length of the rectangular tube is the same as the spacing between two ribs 55 of the cable duct 5.

Figure 3B:
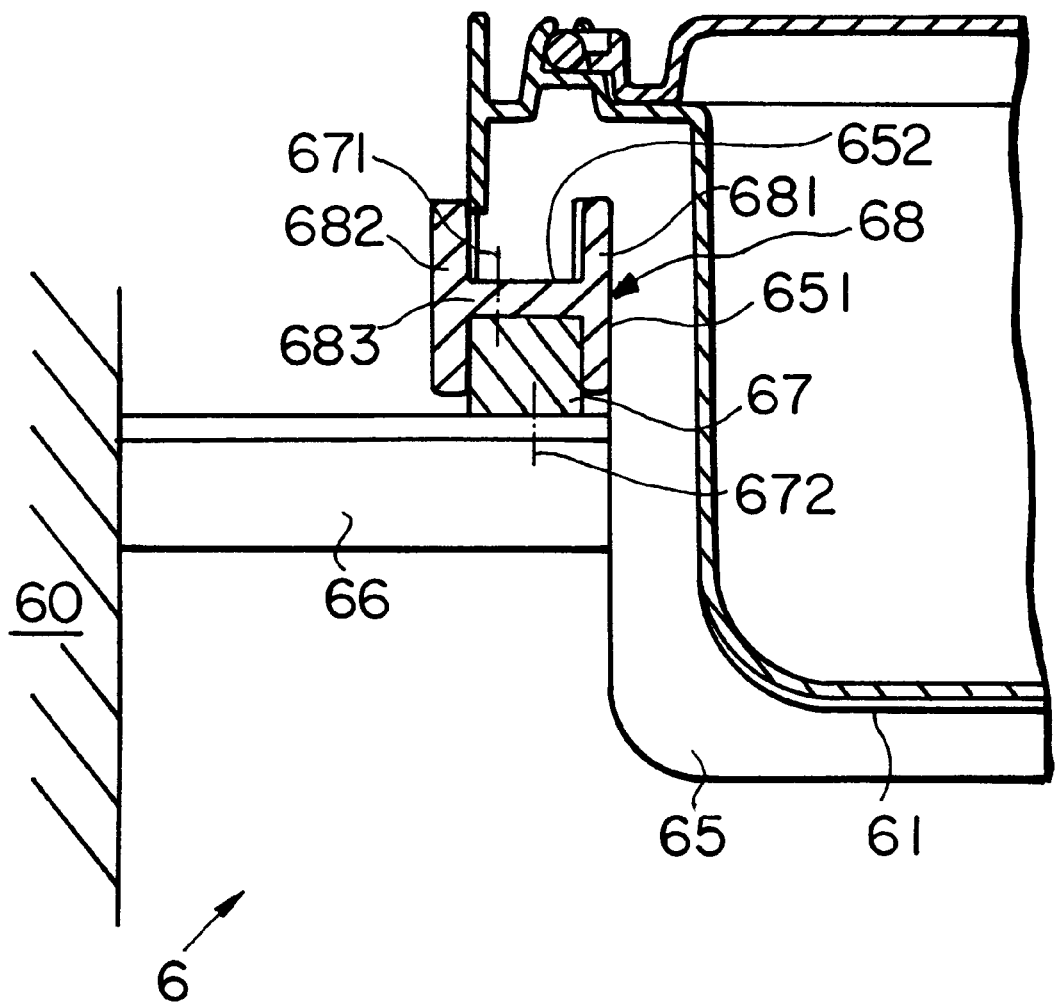

FIG. 3b shows the cable duct 6, in an embodiment similar to the duct 5, supported on a T-profile 66 in a tunnel wall 60. A PVC molding 67 is fastened on the profile by means of a screw 672 and bears an H-profile 68, screw-connected by means of connectors 671. The profile 68 may, in turn, be sheathed in plastic. The flange 681 and the web 683 of the profile 68 retain the trough 61 on the rib parts 652, 651, which are shaped in a complementary manner. In this case, of course, it is also possible to use an H-profile in the case of which the flange 682 likewise has its cross section located within the width of the rib 65. Instead of the, in this case, interrupted or partially worked-away rib 65, it is equally possible for this rib to be designed as a solid rib as in FIG. 3a. In this case, the flange 682 of the H-profile 68 continues from support 66 to the next support 66, for example at a distance of 4 m away, whereas the flange parts 681 are cut away in each case in the region of the rib 65.

FIG. 4 shows a cable duct 7 with a bottom trough part, which rests on a support 76 which is anchored in the ground 70 and has a plate flange 761. An insulating molding 763 separates the load-bearing member 78, which is located within the trough or the rib 75 thereof, from the support. At certain spacings apart, the load-bearing member 78 has bracket-like flange pieces 782 which, in front of each rib 75, engage in stubs 72, jutting back from the inner wall 71 of the trough, and thus secure the trough. Screws 761 and 783 hold the means of elevation together.

Figure 5:
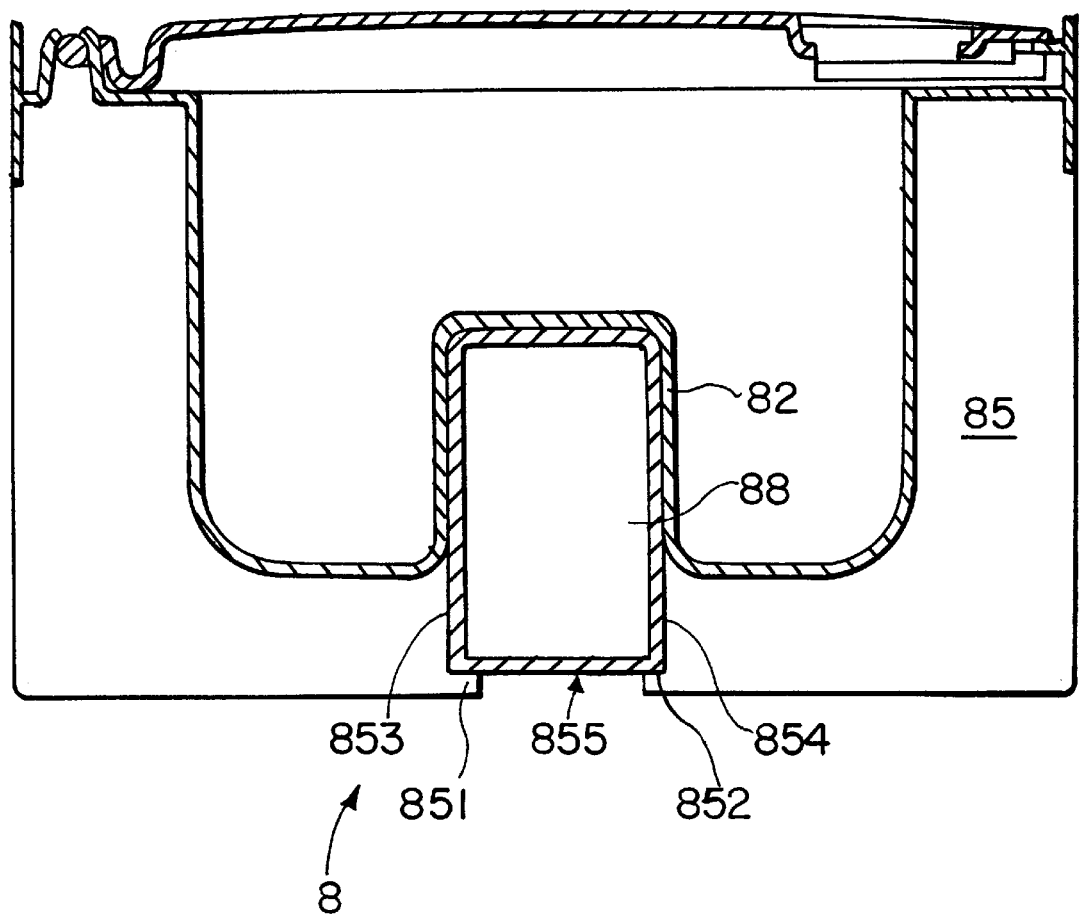
FIG. 5 shows a seventh embodiment, with a load-bearing member comprising a rectangular tube.

FIG. 5 shows a cable duct 8 analogous to FIG. 4. The base 82 of the trough is drawn upward in a central part, this resulting in a trough with a central web. The stiffening transverse rib 85 is interrupted in the central part 855. This results in a recess in the rib, in which a profile 88 is accommodated between the edges 853, 854 of the rib 85 and the base 82. The trough is retained on the profile 88 by the plastic noses 851, 852.

Figure 6:
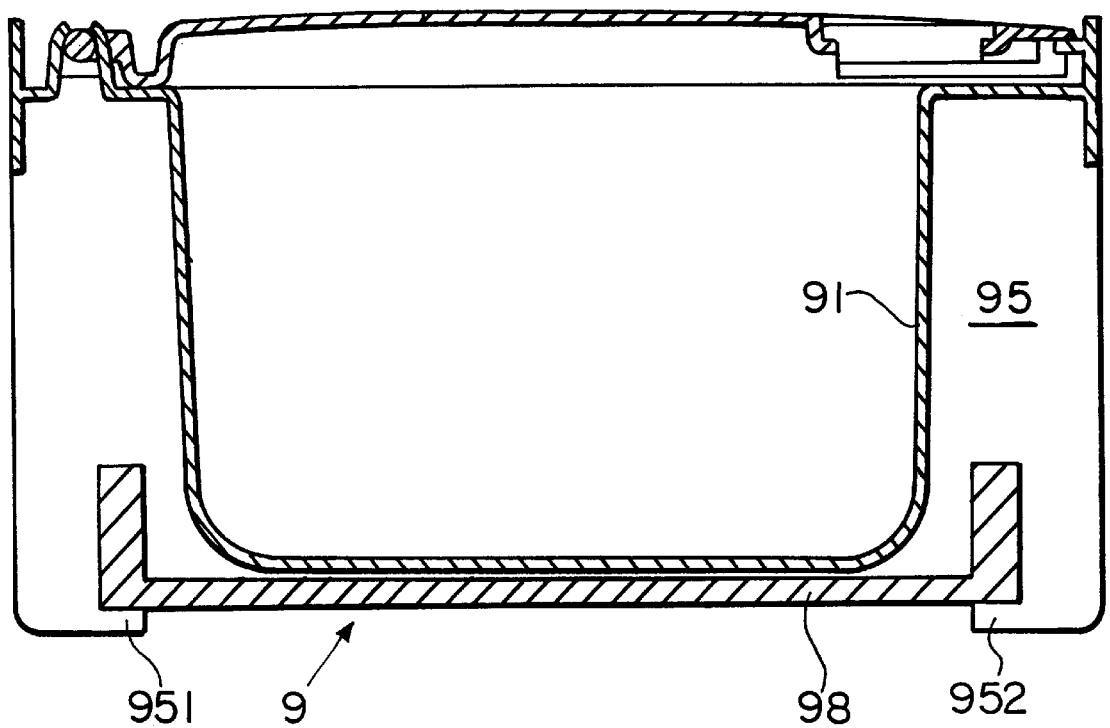
FIG. 6 shows an eighth embodiment, with a U-shaped load-bearing member.

FIG. 6 shows, finally, a U-shaped iron member 98, retained by a support which is not illustrated, as a load-bearing member for a cable duct 9. The stiffening ribs 95 for the trough base 91 have a clearance, which complements the U-shaped iron member 98, so that the trough can be fitted over the load-bearing member and is retained by latching in behind the elastic noses 951, 952.

Figures 8A, 8D:
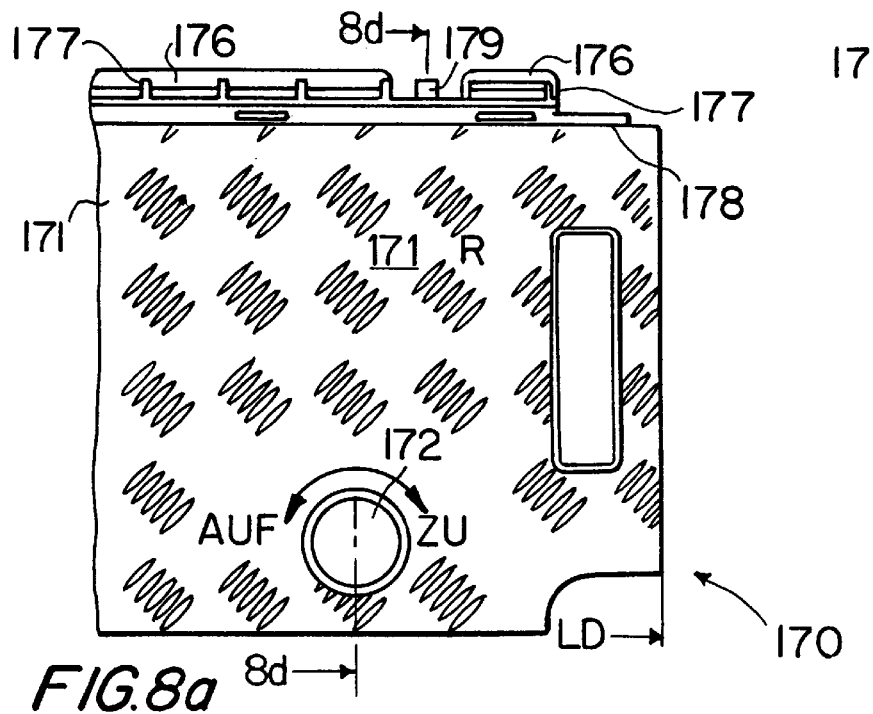
Figure 8B:
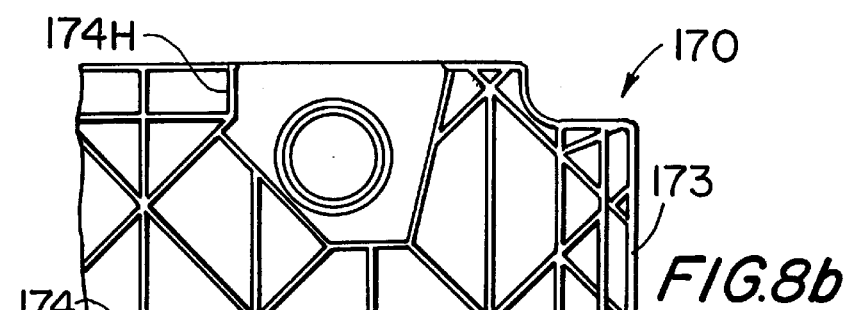
Figure 9:
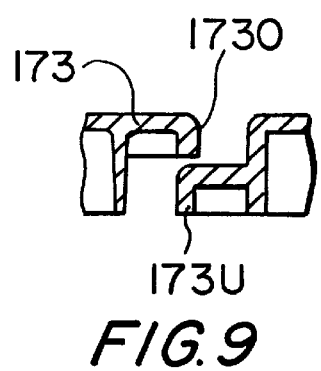
FIG. 9 shows parts of adjacent covers in an overlapping position.
Figure 8C:
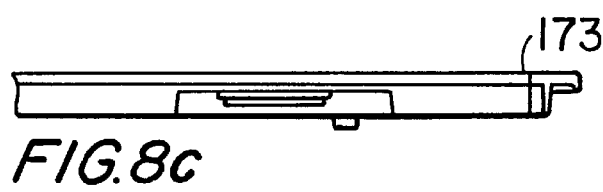

FIG. 7a shows a trough, without a cover, in a plan view with the trough borders 15 and 16 and the associated outer walls 130 on the left and 140 on the right which, for the purpose of saving space widthways, in the region of the recesses 168 and 158 (FIG. 7b) in the ribs 157, 167 of the trough 100, jut outward above the load-bearing members 113. The trough can be screwed to the load-bearing members 113 by means of screws 159, inserted in guide ducts 156, 166 through the trough borders from above. The load-bearing members are retained by a double retaining means 112 which, for its part, is screwed on the support 111 of the supporting arrangement 110. The trough base 120 terminates alternately, in each trough half, in a lip 121 and matching depression 122, with the result that a relatively tight overlapping connection of the inner wall of the trough with a neighboring trough (not illustrated) is possible. Outflow points 169 are arranged on the trough borders 15, 16 as through-passages in order that water can flow out. The locking elements for locking to a matching cover (illustrated in FIGS. 8a–d) comprise, on the right-hand trough border, latches 164 for a lock 172 in the cover 170 and two protuberances 165 for the guidance and/or blockage of longitudinal displacement of the cover in operative connection with the protuberance rib 174H on said cover. Arranged on the left-hand trough border 15 are three systems of bolt holes 155 for three complementary bolts 176 of the cover. The overall length of the bolt holes, or even better bolt-retaining means, which are designed as partially open grip-round portions, is shorter by approximately 5–20 millimeters, specifically by 12 mm, than the respective bolt 176, with the result that the cover 170 can be displaced longitudinally by a maximum of this length and it is possible to vary an overlapping position according to FIG. 9. The through-passages 154 serve for the engagement of a hook 179, which projects from the underside of the cover from a rib thereon, as a means of engagement for securing the cover against being lifted off after it has been positioned on the trough. FIG. 8a shows part of the cover 170 with its top surface 171, provided with ridges 171R in order to prevent slipping. FIG. 8c shows the associated longitudinal section and FIG. 8d shows the cross section of the cover according to section D—D in FIG. 8a. Bolts 176, retained on the cover by way of webs 177, serve for hinging the cover 170 in relation to the trough 100, in co-operation with the previously described bolt-retaining means. When the cover is closed, the hook 179 engages in the through-passage 154 of the trough border 15. In this position, the lock 172 can assume the marked positions OPEN-CLOSED and, in the CLOSED position, can be locked on the latch 164 of the trough. The cover borders 173, partially reinforced at their longitudinally directed ends 173O and 173U (FIG. 9), likewise serve for stiffening the cover, which already has numerous stiffening ribs 174 according to FIG. 8b. The outflow points 178 serve for the outflow of water from the top surface. According to FIG. 9, the cover is longer by the dimension LD (FIG. 8a), specifically by 5 mm, than the associated trough.

What is claimed is:

1. A cable duct, comprising:
   load-bearing members which extend in a longitudinal direction of the cable duct; and
   a plurality of plastic troughs which can be lined up in a row, the troughs each having recesses that can be fitted over the load-bearing members, the recesses being of such a depth that, when the troughs are installed, the load-bearing members are located substantially within contours of the troughs.

2. The cable duct as defined in claim 1, wherein each trough has a transverse rib with a base, and at least one of the recesses one of in and beneath the base.

3. An elevated cable duct, comprising:
   supports;
   load-bearing members arranged on the supports so as to extend in a longitudinal direction of the cable duct;
   plastic troughs which can be lined up in a row next to one another to form the cable duct, the troughs having outer recesses which are fitted over the load-bearing members; and
   means for substantially covering the load-bearing members.

4. The cable duct as defined in claim 3, wherein the troughs are configured so as to engage the load-bearing members as one of a clamp-action and a snap-action closure.

5. The cable duct as defined in claim 3, wherein each trough rests on two parallel of the load-bearing members, the load-bearing members being metal profiles.

6. The cable duct as defined in claim 3, and further comprising a cover, the troughs having borders provided with at least one of through-passages and protuberances for form-fit interlocking with the cover.

7. The cable duct as defined in claim 3, and further comprising a cover which can be interlocked with the troughs in a form-fitting manner.

8. An elevated cable duct, comprising:
   supports;
   load-bearing members arranged on the supports so as to extend in a longitudinal direction of the cable duct; and
   plastic troughs which can be lined up in a row next to one another to form the cable duct, the troughs having outer recesses which are fitted over the load-bearing members, the covering means comprising aprons integrally formed on each of the troughs.

9. An elevated cable duct, comprising:
   supports;
   load-bearing members arranged on the supports so as to extend in a longitudinal direction of the cable duct; and
   plastic troughs which can be lined up in a row next to one another to form the cable duct, the troughs having outer recesses which are fitted over the load-bearing members, the covering means comprising aprons mounted on one of the troughs, the load-bearing members, and the supports.

10. An elevated cable duct, comprising:
    supports;
    load-bearing members arranged on the supports so as to extend in a longitudinal direction of the cable duct; and
    plastic troughs which can be lined up in a row next to one another to form the cable duct, the troughs having outer recesses which are fitted over the load-bearing members, the troughs being provided with a cross-sectionally u-shaped inner wall which terminates in each case in protrusions, which become part of an inner wall of an adjacent one of the troughs.

11. An elevated cable duct, comprising:
    supports;
    load-bearing members arranged on the supports so as to extend in a longitudinal direction of the cable duct;
    plastic troughs which can be lined up in a row next to one another to form the cable duct, the troughs having outer recesses which are fitted over the load-bearing members; and
    screws that connect the troughs to the load-bearing member, the screws engaging through a trough border vertically.

12. The cable duct as defined in claim 11, wherein the screws are configured in a self-tapping manner for metal.

13. An elevated cable duct, comprising:
    supports;
    load-bearing members arranged on the supports so as to extend in a longitudinal direction of the cable duct; and
    plastic troughs which can be lined up in a row next to another to form the cable duct, the troughs having outer recesses which are fitted over the load-bearing members, the load-bearing members being hollow metal profiles.

14. An elevated cable duct, comprising:

supports;

load-bearing members arranged on the supports so as to extend in a longitudinal direction of the cable duct; and plastic troughs which can be lined up in a row next to one another to form the cable duct, the troughs having outer recesses which are fitted over the load-bearing members, the load-bearing members being externally coated with plastic.

15. An elevated cable duct, comprising:

supports;

load-bearing members arranged on the supports so as to extend in a longitudinal direction of the cable duct; and plastic troughs which can be lined up in a row next to one another to form the cable duct, the troughs having outer recesses which are fitted over the load-bearing members, the load-bearing members being configured to connect the supports to one another.

16. An elevated cable duct, comprising:

supports;

load-bearing members arranged on the supports so as to extend in a longitudinal direction of the cable duct;

plastic troughs which can be lined up in a row next to one another to form the cable duct, the troughs having outer recesses which are fitted over the load-bearing members; and plastic moldings arranged to connect the load-bearing members to the supports.

17. The cable duct as defined in claim 16, wherein the moldings at least partially grip round an underside of the load-bearing members.

18. A cover for troughs which can be lined up in a row next to one another and are intended for cable ducts, the cover comprising a closed top surface and stiffening ribs arranged in a projecting manner on an underside, and cover borders of the troughs and can be interlocked with the troughs at least on one side, wherein it can be interlocked in the manner of a hinge, the hinge comprising a plurality of bolt parts, which are connected to the cover and are each longer than complementary bolt-securing means on the trough, the cover being slightly longer than an associated trough, at both ends of the cover, the stiffening ribs are reduced to less than half their height starting from a center of the cover toward edges of the cover, the cover having a thickness that is reduced at one end from the underside and at another end from a top surface.

19. The cover as defined in claim 18, and further comprising a hook that projects downward from one of the stiffening ribs, the hook being configured such that it engages in a clearance of the trough border serving for bearing the cover.

20. The cover as defined in claim 18, wherein the stiffening ribs on the cover borders are configured such that they serve as a stop for a protuberance on the trough border.

21. An elevated cable duct, comprising:

supports;

load-bearing members arranged on the supports so as to extend in a longitudinal direction of the cable duct;

plastic troughs which can be lined up in a row next to one another to form the cable duct, the troughs having outer recesses which are fitted over the load-bearing members; and a cover comprising a closed top surface and stiffening ribs arranged in a projecting manner on an underside, and cover borders of the troughs and can be interlocked with the troughs at least on one side, wherein it can be interlocked in the manner of a hinge, the hinge comprising a plurality of bolt parts, which are connected to the cover and are each longer than complementary bolt-securing means on the trough, the cover being slightly longer than an associated trough, at both ends of the cover, the stiffening ribs are reduced to less than half their height starting from a center of the cover toward edges of the cover, the cover having a thickness that is reduced at one end from the underside and at another end from a top surface.

* * * * *